US005533119A

United States Patent [19]
Adair et al.

[11] Patent Number: 5,533,119
[45] Date of Patent: Jul. 2, 1996

[54] METHOD AND APPARATUS FOR SIDETONE OPTIMIZATION

[75] Inventors: Gary E. Adair, Plantation; Paul Joyce, Boca Raton, both of Fla.

[73] Assignee: Motorola, Inc., Schaumburg, Ill.

[21] Appl. No.: 250,873

[22] Filed: May 31, 1994

[51] Int. Cl.$^6$ .................................................. H04M 1/58
[52] U.S. Cl. .................................. 379/391; 379/403
[58] Field of Search ................................ 379/391, 399, 379/403, 410

[56] References Cited

U.S. PATENT DOCUMENTS

| | | | |
|---|---|---|---|
| 3,892,924 | 7/1975 | Vachon | 379/391 |
| 4,096,361 | 6/1978 | Crawford | 379/403 |
| 4,096,362 | 6/1978 | Crawford | 379/403 |
| 4,275,276 | 6/1981 | Rizzo | 379/403 |
| 4,278,848 | 7/1981 | Rizzo et al. | 379/403 |
| 4,365,119 | 12/1982 | Chung et al. | 379/410 |
| 4,368,361 | 1/1983 | Chung et al. | 379/410 |
| 4,368,362 | 1/1983 | Chung et al. | 379/410 |
| 5,029,203 | 7/1991 | Ikefuji et al. | 379/391 |
| 5,133,007 | 7/1992 | Nisimura | 379/391 |
| 5,357,569 | 10/1994 | Garcia et al. | 379/399 |

OTHER PUBLICATIONS

L3000 Subscriber Line Interface Series Datasheets and Application Notes, Mar. 9, 1993, by SGS–Thomson, SLIC L3000/L3092.
Telecoms IC Handbook, Plessey Semiconductors, p. 61, Plessey Company, Plc 1988, Publication No. P.S. 1913.

*Primary Examiner*—Jeffery Hofsass
*Assistant Examiner*—Scott Wolinsky
*Attorney, Agent, or Firm*—John G. Rauch

[57] ABSTRACT

A sidetone optimization circuit (230) provides the capability to adjust sidetone level received at a telephone handset to a desired level. A noise source (204) generates a noise signal that gets filtered by filter (206) in order to provide band limited noise to a telephone interface circuit (202). Telephone interface circuit (202) provides a sidetone signal (210), also known as a trans-hybrid loss signal. The trans-hybrid loss signal is filtered at filter (212) and transformed to a DC level at detector (214). The DC level is then compared to a predetermined threshold at comparator (224), and a variable impedance circuit (218) is adjusted until the DC level reaches the predetermined threshold in order to achieve a desired level of sidetone.

15 Claims, 4 Drawing Sheets

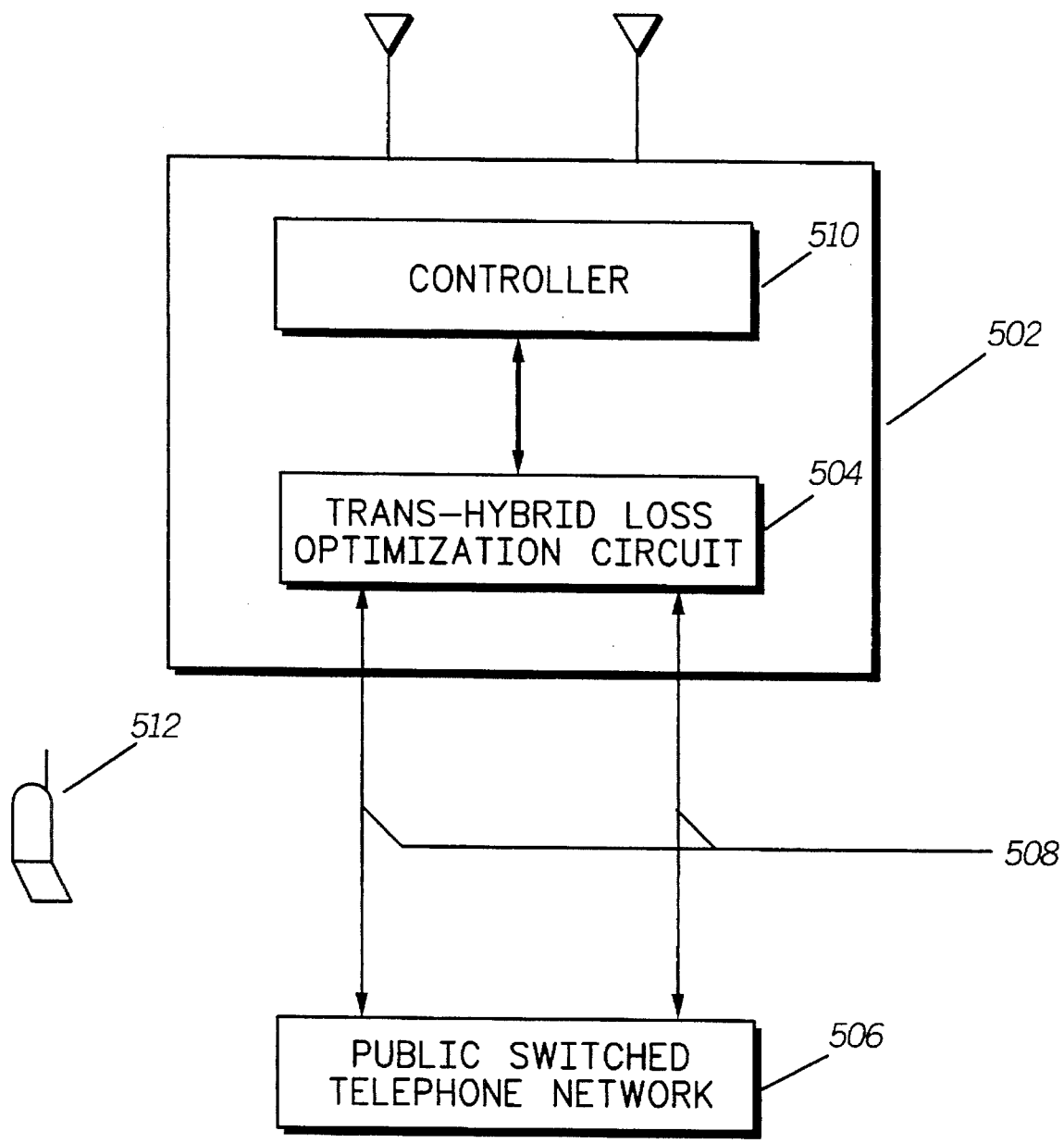

METHOD AND APPARATUS FOR SIDETONE OPTIMIZATION

TECHNICAL FIELD

This invention relates generally to communication systems, and more specifically to a method and apparatus for optimizing sidetone.

BACKGROUND

Many telephone systems, particularly cordless telephone systems, are designed to operate in urban environments which have a high level of ambient noise. Conditions of this type make the optimization of sidetone level extremely important. In telephony, sidetone is defined as an attenuated level of one's own voice heard in the telephone handset ear piece. High sidetone levels are not only annoying to the user but can, under certain conditions, severely degrade intelligibility. The level of sidetone is dependent to a great extent upon the telephone line conditions unique to each installation. A mismatch between the telephone line and the telephone instrument can cause a high level of sidetone which is disturbing to the user and adversely affects intelligibility. Some sidetone is desirable to make the user aware that the telephone is active. However, a loud operating environment often necessitates the use of high receive volume levels in a cordless handset, with the result that the sidetone level increases to the extent that the background noise in the ear piece reduces intelligibility.

Some telephone exchanges, such as public switched telephone networks, use digital signal processing (DSP) techniques to remove the transmitted speech from the receive path however, this is a costly approach for a low cost consumer product. Hence, there is a need for a cost effective circuit and technique that reduces sidetone in a handset.

BRIEF DESCRIPTION OF THE DRAWINGS

FIG. 5 is a block diagram of a communication system employing the sidetone optimization circuit in accordance with the present invention.

DETAILED DESCRIPTION OF THE PREFERRED EMBODIMENT

Figure 1:
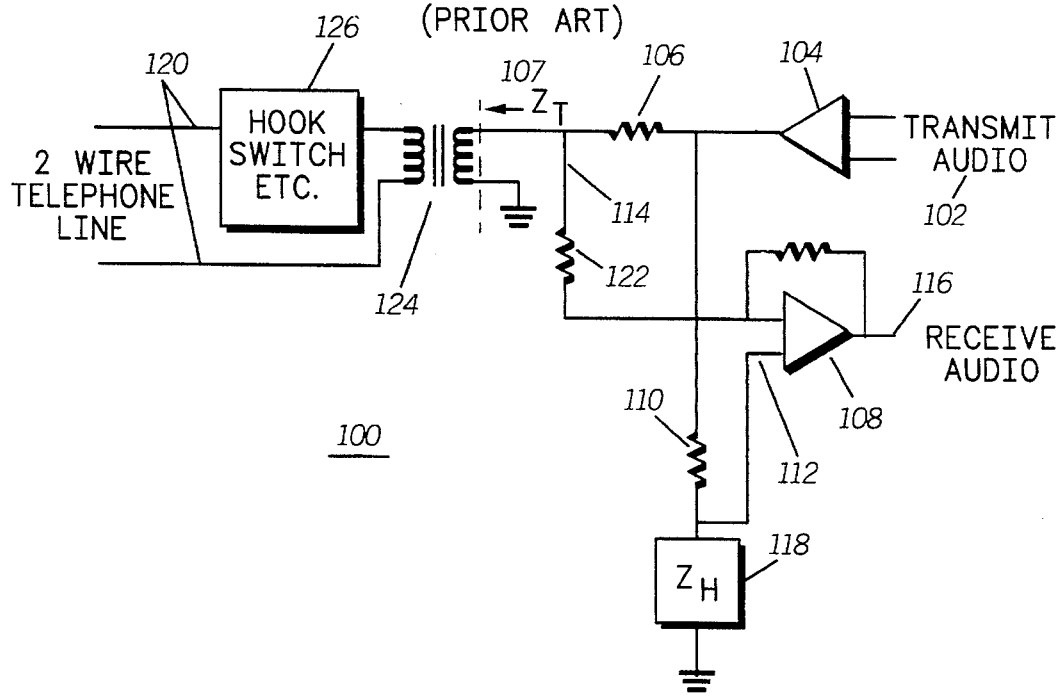
FIG. 1 is a schematic of a prior art telephone hybrid.

Hybrids are used in telephones to convert to and from 2-wire and 4-wire audio. An example of a basic telephone hybrid schematic is shown in FIG. 1 of the accompanying drawings. Telephone hybrid 100, also known as a telephone interface circuit, receives a transmit audio signal 102 that gets amplified at amplifier 104 and coupled via resistor 106 into an impedance $Z_T$ 107. Impedance $Z_T$ 107 represents the impedance of such components as a transformer 124 and hook switch 126 that interface a telephone handset signal to a 2-wire telephone line 120. In a receive mode, the telephone hybrid 100 receives an audio signal at the 2 wire telephone line 120 and couples the audio signal through the associated hook switch 126 and transformer 124. The receive audio signal is then coupled through resistor 122 to amplifier 108 where the audio signal is output into the receive audio path 116. This describes the basic signal flow for both transmitted and received audio. When audio is transmitted into amplifier 104 a loss occurs across the resistor 106, resulting from the impedance $Z_T$ and some phase shift that occurs to the signal. The resulting loss signal 114 is directed to amplifier 108 through resistor 122. Amplifier 108, normally used for the receive audio signal, is now required to reject this transmitted loss signal 114.

A portion of the output signal of amplifier 104 is coupled via resistor 110 to a positive input terminal 112 of amplifier 108 such that the level of signal going into the positive terminal has the same amplitude and phase shift as the level of signal 114. This results in the amplifier 108 not generating a receive audio signal in the receive audio path 116.

Any residual transmit signal in the receive path 116 is called transhybrid loss or sidetone. All telephone users experience an attenuated version of their own voice in the ear piece as a result of the trans-hybrid loss. In order to ensure that there is no output signal at the amplifier 108, the losses across resistor 106 and resistor 110 must be equivalent. Typically, impedance $Z_T$ 107 varies widely with telephone line length, and so a compromise network, fixed impedance $Z_H$ 118, is used to give overall reasonable rejection of the transmitted signal 102 in the receive path 116.

Due to the fact that sidetone varies with line impedance, by virtue of the four to two wire conversion process, a sidetone adjustment circuit to be described herein will ensure good sidetone rejection.

Figure 2:
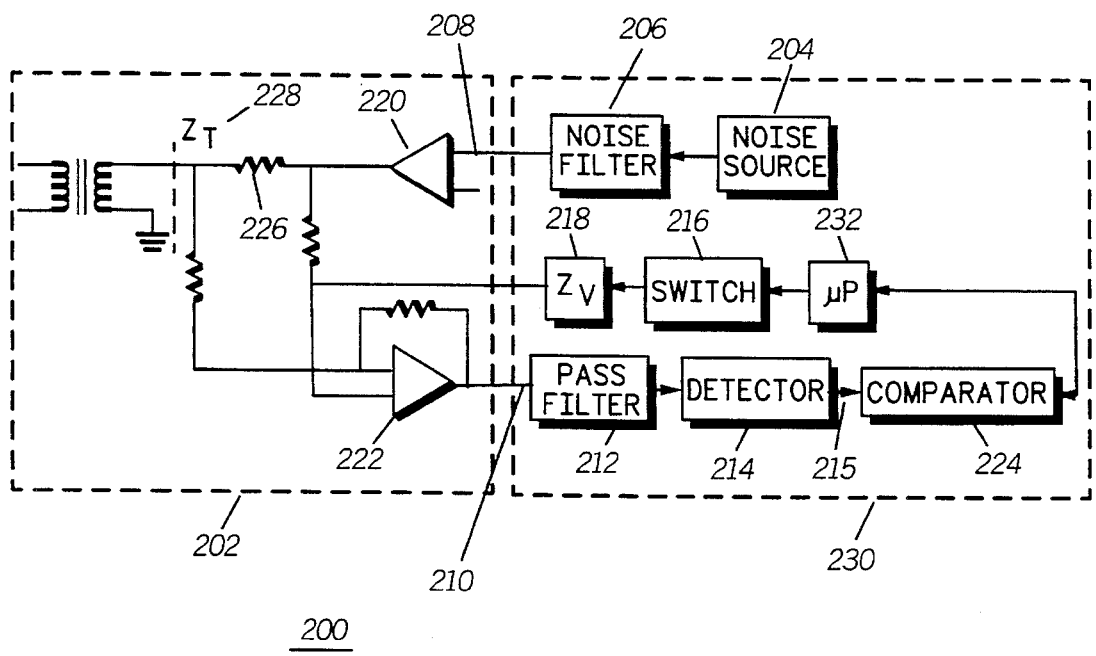
FIG. 2 is a drawing of a first embodiment of a sidetone optimization circuit in accordance with the present invention.

FIG. 2 of the accompanying drawings shows a telephone hybrid and sidetone optimization circuit 200 in accordance with the present invention. The basic operation of the telephone hybrid section 202 remains the same as that described for FIG. 1. However, optimization section 230 which includes a noise source 204 and noise filter 206 are installed in the transmit audio path 208. Also, included in optimization section 230 in the receive audio path, are band pass filter 212 and detector 214. The noise source 204, telephone interface circuit 202, detector 214, and comparator 224 circuits are collectively referred to as a sidetone generation circuit. Switches 216, preferably CMOS (complimentary-symmetry metal-oxide-semiconductor) switches under microprocessor control 232, are coupled to a variable impedance network $Z_V$ 218 for automatically adjusting the variable impedance for the sidetone generation circuit to a predetermined level.

The telephone hybrid with sidetone optimization 200 provides a method for optimizing the level of sidetone that will be heard at the earpiece by using the following technique. A noise burst is generated by the noise source 204 and filtered by filter 206 to provide a band limited noise signal to the transmit path 208. A loss occurs across the resistor 226, resulting from the impedance $Z_T$ 228 and some phase shift, and this loss results in first and second attenuated signals being presented to input ports of an amplifier 222 whose purpose is to reject the attenuated signals.

By injecting band limited noise into transmit amplifier 220, a sidetone signal (or trans-hybrid-loss signal) 210 will be produced at the output of amplifier 222. In the preferred embodiment of the invention, amplifier 222 is a differential operational amplifier that subtracts the first and second attenuated signals to generate the trans-hybrid loss signal 210. The trans-hybrid loss signal 210 is generated as a wide band signal which then gets filtered by filter 212, preferably a band pass filter, and detected by detector 214. This detected trans-hybrid loss signal (or detected sidetone signal) 215 is transformed to a DC level by detector 214 and then provided to the comparator 224.

If the DC level received by the comparator 224 is higher than a predetermined maximum level, or threshold, then the CMOS switches 216 adjust the variable impedance circuit $Z_V$ 218 until the DC level falls below the threshold level. Impedance $Z_V$ 218 may thus be adjusted until the detected wide band signal 215 reaches a minimum value (i.e. minimum sidetone level). Similarly, since a certain level of sidetone is usually desired, the DC level can be increased or decreased, via the variable impedance circuit $Z_V$ 218, until the trans-hybrid loss signal falls within a predetermined threshold.

Figure 3:
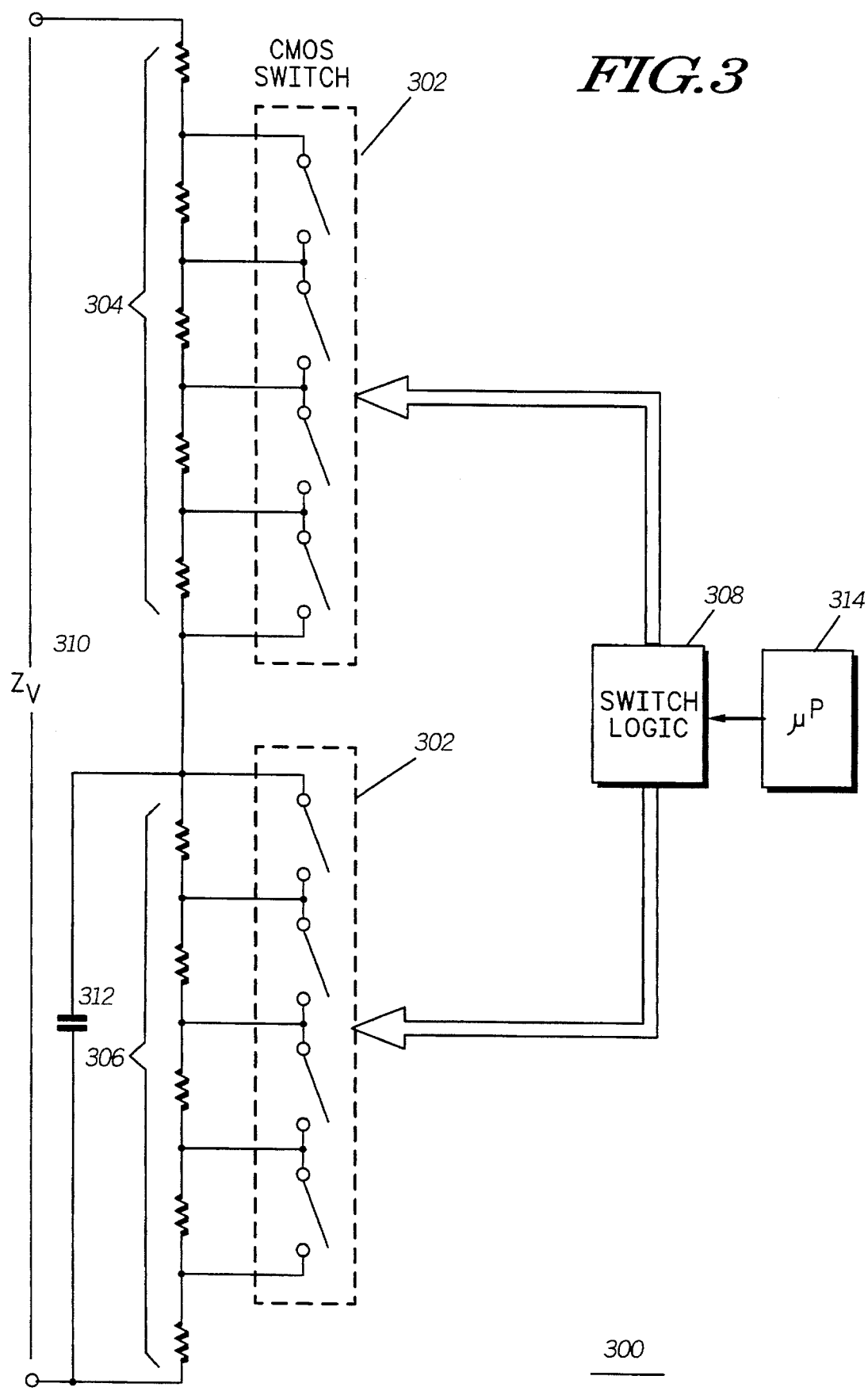
FIG. 3 is a schematic diagram of an impedance control circuit in accordance with the present invention.

An example of a preferred embodiment for variable impedance network $Z_V$ 218 and switches 216 is shown as circuit 300 in FIG. 3. Switches 302, which are preferably CMOS switches under switch logic control 308, bypass resistors within resistor arrays 304 and 306. The resistor arrays 304 and 306 are preferably scaled in binary, and thus 16 values (i.e. 16 impedances) are available. The switch logic 308 is preferably under microprocessor control 314. In the preferred embodiment, the switch logic control 308 causes resistor array 302 to increase in resistance while resistor array 306 decreases in resistance thus providing tuning capability of impedance $Z_V$ 310. A capacitor 312 may be added in parallel across resistor array 306 to create a balanced network impedance 310 that provides a good simulation of the largely resistive and capacitive twisted pair telephone line.

Figure 4:
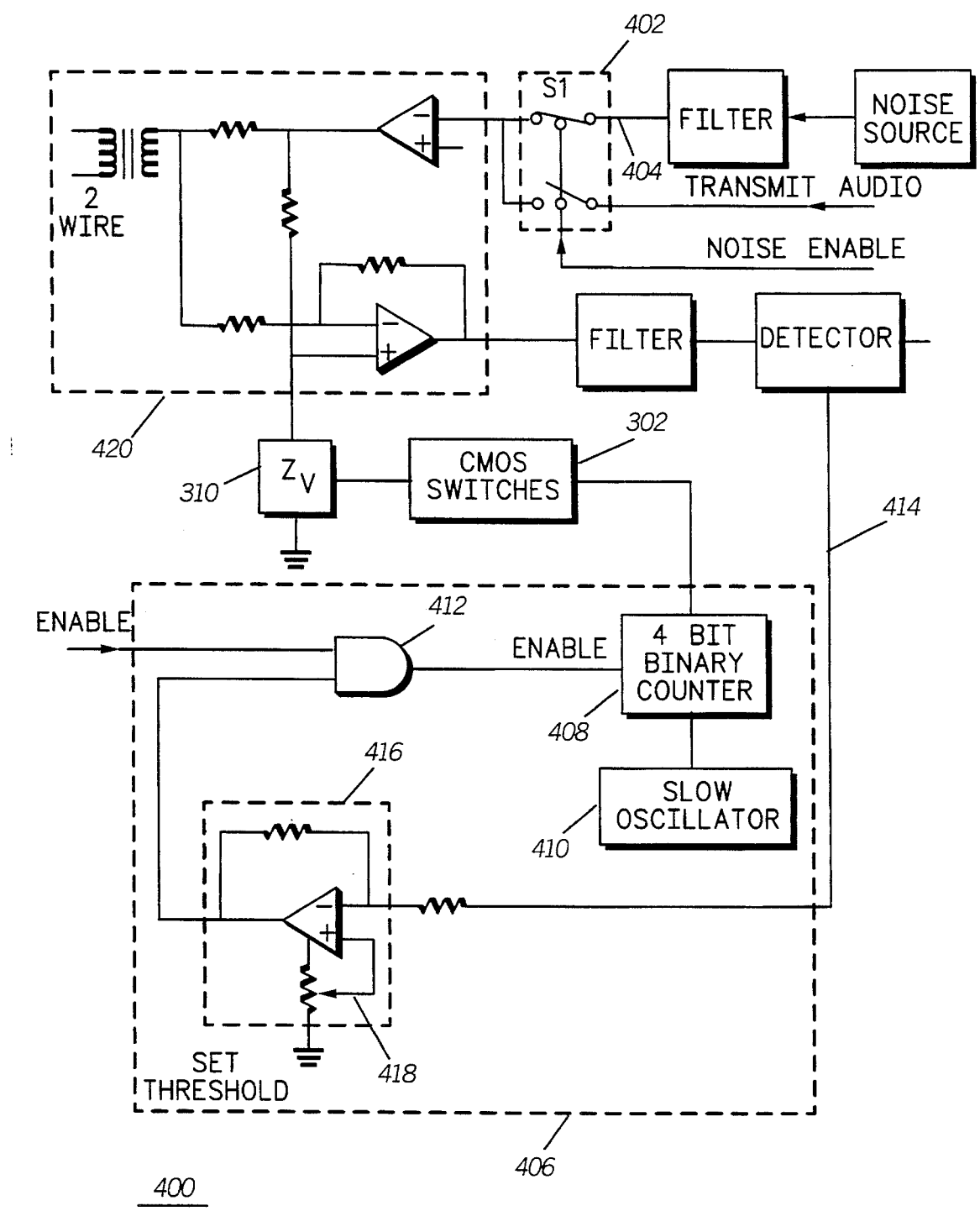
FIG. 4 is a second embodiment of a sidetone optimization circuit in accordance with the present invention.

A second embodiment of the invention is shown in FIG. 4 where a second telephone hybrid and sidetone optimization circuit 400 is shown. Section 420 operates as previously described in the telephone hybrid circuit of FIG. 1. Switches 402 control audio and filtered noise going into transmit path 404. CMOS switches 302 control the $Z_V$ impedance 310 as previously described in FIG. 3. The switches 302 are now controlled by switch logic control circuit 406 which comprises a counter 408, preferably a 4 bit binary counter, operating from an oscillator 410. Also included in the switch control circuit 406 is logic gate 412 which enables the binary counter circuit 408 to drive the CMOS switches 302 in sequence. The detected sidetone level 414 is a DC level that gets fed to comparator circuit 416. Comparator circuit 416 is preferably a differential operational amplifier with adjustable threshold 418, and hence provides an adjustable sidetone level. When the inverting input of the differential operational amplifier receives a detected sidetone level 414 that matches a level set by the adjustable threshold 418, the comparator output goes low, inhibiting the counter 408. Once the counter 408 is inhibited, a constant impedance 310 is provided to the telephone hybrid circuit 420 that balances the circuit to provide an optimum level of sidetone. Circuit 400 thus provides a means for optimizing sidetone without the use of a microprocessor.

The trans-hybrid loss optimization circuit may be employed in a communication device such as a base station that is coupled to a public switched telephone network (PSTN) as shown in FIG. 5. The base station 502 includes the trans-hybrid loss optimization circuit 504, as described by the preferred embodiment of the invention, which gets coupled to the PSTN 506 through telephone interface lines 508, such as two wire telephone lines. The trans-hybrid loss optimization circuit 504 includes the sidetone generation circuit and variable impedance circuit as previously described. Also, included within the base station 502 is controller section 510 for operatively adjusting the trans-hybrid loss (i.e. level of sidetone) of the trans-hybrid loss optimization circuit 504 such that an optimum level of sidetone is received by the user of the handset 5 12. The trans-hybrid loss optimization circuit as described by the invention may be applied to such communication systems as Second Generation Cordless Telephone (CT2).

This invention automatically selects, from a wide choice of component values, the best combination to adapt to the telephone line conditions. Also, the same circuits and techniques as those described by the invention could be used in conjunction with an integrated telephone speech network rather the typical telephone hybrid described. Furthermore, while the noise is shown generated from a noise source, it could also be generated as pseudo random noise from a microprocessor or other similar hardware designs. Once the trans-hybrid loss signal is generated, a sidetone adjustment circuit filters and detects the trans-hybrid loss signal in order to generate a DC level. This DC level is then adjusted by the variable impedance circuit to establish a predetermined level of sidetone.

Hence, the sidetone optimization circuit as described by the invention provides an efficient technique for adjusting sidetone without the expense of a DSP circuit. This adjustment of sidetone could be performed on a quiet line, perhaps in the post-dialing pause before receiving "ringback" from the PSTN. Audio may then be switched in or summed into the negative input terminal of the transmit amplifier 220.

This design is low in cost and can be readily implemented in any product using a 2 to 4 wire hybrid to interface to a telephone line connection. By including the sidetone optimization circuit in the design of the telephone interface, the quality of a telephone product can be greatly enhanced. This sidetone optimization circuit automatically aligns the telephone instrument with existing telephone line conditions. The result is optimized sidetone for each installation.

What is claimed is:

1. A method for adjusting trans-hybrid loss in a communication device, the method comprising the steps of:

(a) generating a noise burst;

(b) generating a trans-hybrid loss signal based on the noise burst;

(c) comparing the trans-hybrid loss signal to a threshold; and (d) adjusting the trans-hybrid loss signal to a level substantially equal to the threshold when the trans-hybrid loss signal varies from the threshold.

2. A method as described in claim 1, wherein step (c), comprises the steps of:

(c1) filtering the trans-hybrid loss signal;

(c2) detecting the filtered trans-hybrid loss signal;

(c3) transforming the filtered trans-hybrid loss signal to a DC level; and (c4) comparing the DC level to the threshold.

3. A method as described in claim 2, wherein step (d) comprises the step of decreasing the DC level until it falls below the threshold.

4. A method as described in claim 2, wherein step (d) comprises the step of increasing the DC level until it falls above the threshold.

5. A communication device configured to be coupled to a public switched telephone network (PSTN), the communication device comprising:

a sidetone generation circuit, including a noise source for generating a noise signal, a telephone interface circuit coupled to the sidetone generation circuit and configured to be coupled to the PSTN for generating a trans-hybrid loss signal in response to the noise signal;

a sidetone adjustment circuit for receiving the trans-hybrid loss signal and for providing an adjusted trans-hybrid loss signal; and a controller for operatively adjusting the sidetone adjustment circuit in response to the trans-hybrid loss signal, the controller comparing the trans-hybrid loss signal to a threshold and providing the adjusted trans-hybrid loss signal when the trans-hybrid loss signal is not substantially equal to the threshold.

6. A communication device as described in claim 5, wherein the side tone adjustment circuit comprises:

a filter for filtering the trans-hybrid loss signal;

a detector for transforming the trans-hybrid loss signal to a DC level; and an impedance adjustment circuit coupled to the telephone interface circuit, the impedance adjustment circuit responsive to the controller for adjusting the trans-hybrid loss signal.

7. A communication device as described in claim 6, wherein the impedance adjustment circuit comprises:

a resistor array;

a capacitor coupled to the resistor array; and switches responsive to the controller for controlling the resistor array.

8. A sidetone optimization circuit comprising:

a noise source for generating a noise burst;

a filter for filtering the noise burst and providing a band limited noise signal;

a telephone interface circuit for receiving the band limited noise signal and providing a sidetone signal based on the band limited noise signal, the telephone interface circuit including:

a transmit amplifier for amplifying the band limited noise signal;

an operational amplifier responsive to the band limited noise signal for generating the sidetone signal;

an impedance control network coupled to the telephone interface circuit for automatically adjusting the sidetone signal;

a second filter for filtering the sidetone signal;

a detector responsive to the sidetone signal for providing a DC level; and a comparator for comparing the DC level to a predetermined level, the impedance control network automatically adjusting the DC level when the sidetone signal does not equal the predetermined level.

9. A sidetone optimization circuit as described in claim 8, wherein the impedance control network comprises:

a resistor array;

a capacitor; and switches coupled to the resistor array for controlling the impedance control network.

10. A sidetone optimization circuit as described in claim 8, wherein the transmit amplifier comprises a differential operational amplifier.

11. A communication system, comprising:

a base station configured to be coupled to a public switched telephone network (PSTN), the base station including a sidetone generation circuit, the sidetone generation circuit including:

a noise source for generating a noise signal;

a telephone interface circuit coupled to the noise source and configured to be coupled to the PSTN for receiving the noise signal and generating a sidetone signal;

a comparator for providing an adjustment signal when the sidetone signal varies from a threshold level; a variable impedance circuit for adjusting the sidetone generation circuit in response to the adjustment signal; and at least one handset configured for radio communication with the base station.

12. A communication system as described in claim 11, wherein the sidetone generation circuit further includes:

a detector circuit coupled to the telephone interface circuit for detecting the sidetone signal, and providing a DC level to the comparator in response to detecting the sidetone signal.

13. A communication system as described in claim 12, further comprising:

a first filter coupled between the noise source and the telephone interface circuit; and a second filter coupled between the telephone interface circuit and the detector circuit.

14. A communication system as described in claim 11, wherein the variable impedance circuit comprises:

a resistor array; and

CMOS switches for controlling the resistor array.

15. A communication system as described in claim 14, further comprising:

a counter for providing binary data to the CMOS switches; and a logic gate for controlling the counter.

* * * * *